United States Patent [19]

Rice

[11] E Patent Number: Re. 32,150

[45] Reissued Date of Patent: May 20, 1986

[54] WEIGHTED ROTATABLE THERAPEUTIC EXERCISE DEVICE

[76] Inventor: Max Rice, 1501 17th Ave., Apt. 712, Seattle, Wash. 98122

[21] Appl. No.: 613,802

[22] Filed: May 23, 1984

Related U.S. Patent Documents

Reissue of:

[64] Patent No.: 4,385,761
Issued: May 31, 1983
Appl. No.: 235,945
Filed: Feb. 19, 1981

[51] Int. Cl.[4] ..... A63B 21/00

[52] U.S. Cl. ..... 272/128; 272/117; 272/146

[58] Field of Search ..... 272/93, 117, 128, 146, 272/132, 134, 120, 121, 126, DIG. 4, 133, 144

[56] References Cited

U.S. PATENT DOCUMENTS

| | | | |
|---|---|---|---|
| D. 231,242 | 4/1974 | Herrmann . | |
| 1,065,022 | 6/1913 | Bell | 248/413 |
| 2,530,921 | 11/1950 | Tougas | 272/132 |
| 2,785,896 | 3/1957 | Ellis | 272/33 R |
| 3,100,639 | 8/1963 | Bonewitz . | |
| 3,384,369 | 5/1968 | Rumell | 272/146 X |
| 3,659,844 | 5/1972 | Cummins | 272/109 X |
| 3,841,627 | 10/1974 | Vetter . | |
| 3,911,907 | 10/1975 | Smith | 272/146 X |
| 3,936,047 | 2/1976 | Brandt et al. . | |
| 4,026,279 | 5/1977 | Simjian . | |
| 4,077,626 | 3/1978 | Newman . | |
| 4,132,405 | 1/1979 | Asher . | |
| 4,153,244 | 5/1979 | Tauber, Jr. . | |
| 4,220,329 | 9/1980 | Agyagos . | |
| 4,305,579 | 12/1981 | Rice | 272/146 |
| 4,313,603 | 2/1982 | Simjian . | |

*Primary Examiner*—Richard J. Apley
*Assistant Examiner*—William R. Browne
*Attorney, Agent, or Firm*—Graybeal & Cullom

[57] ABSTRACT

An exercising apparatus that is designed particularly for therapeutic purposes. The apparatus includes a rotatable turntable on a stationary base, and a post extending through the weight supporting center of the turntable for supporting a person. A pipe frame is mounted on the base for being grasped by the person so as to twist himself on the device. A pull rope is tied to the turntable and passed over a pulley on the base for hand-rotating the same.

5 Claims, 6 Drawing Figures

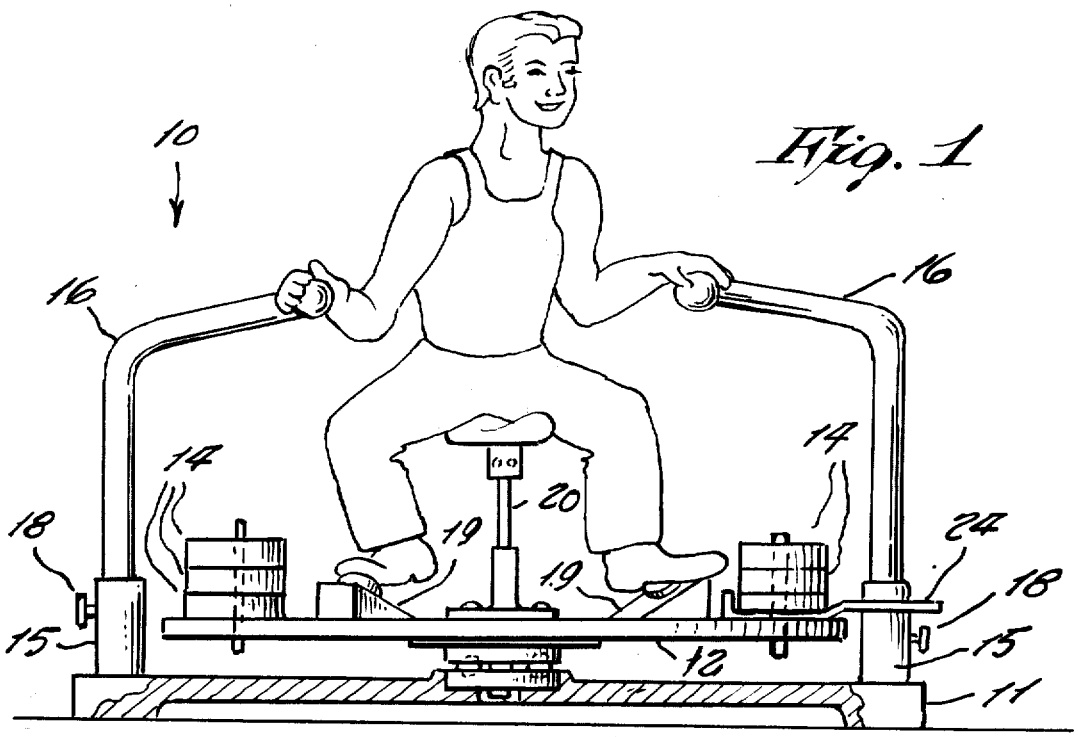
Fig. 1
Fig. 2
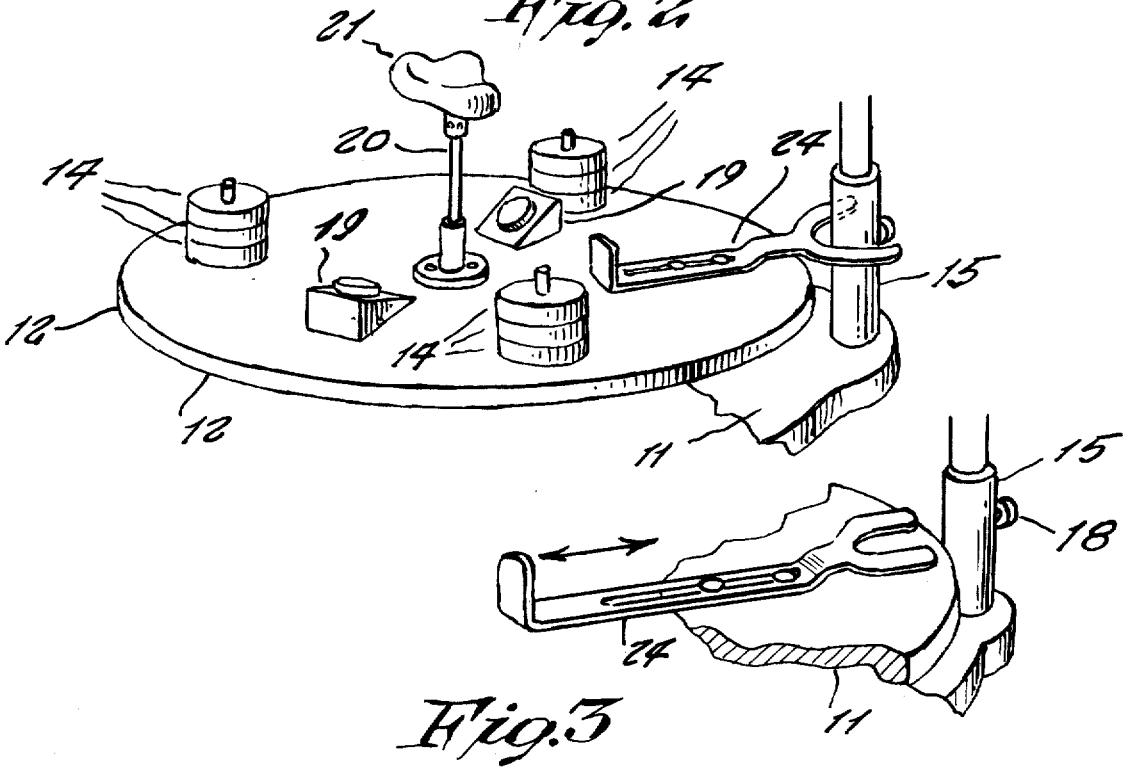
Fig. 3

Fig. 4
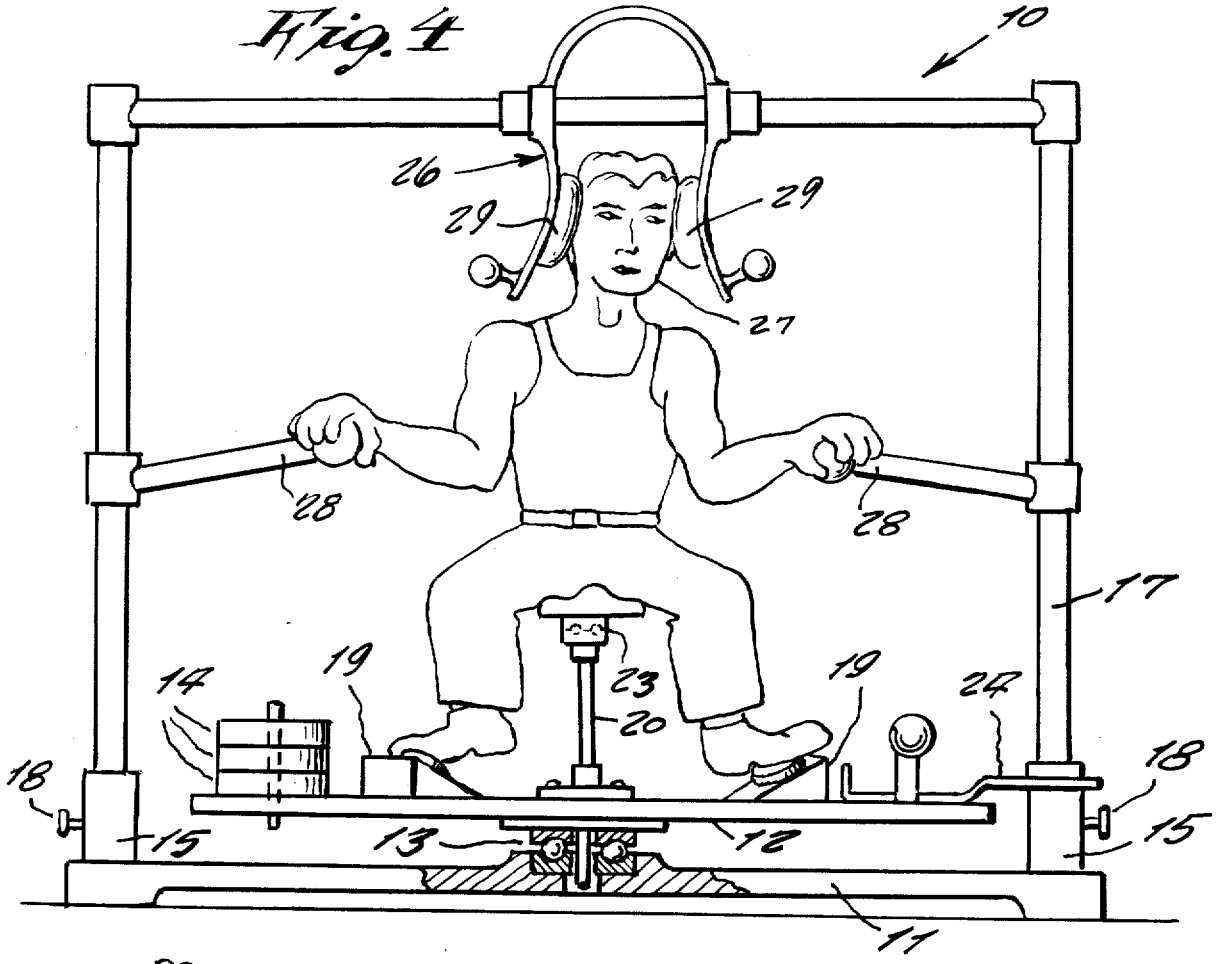
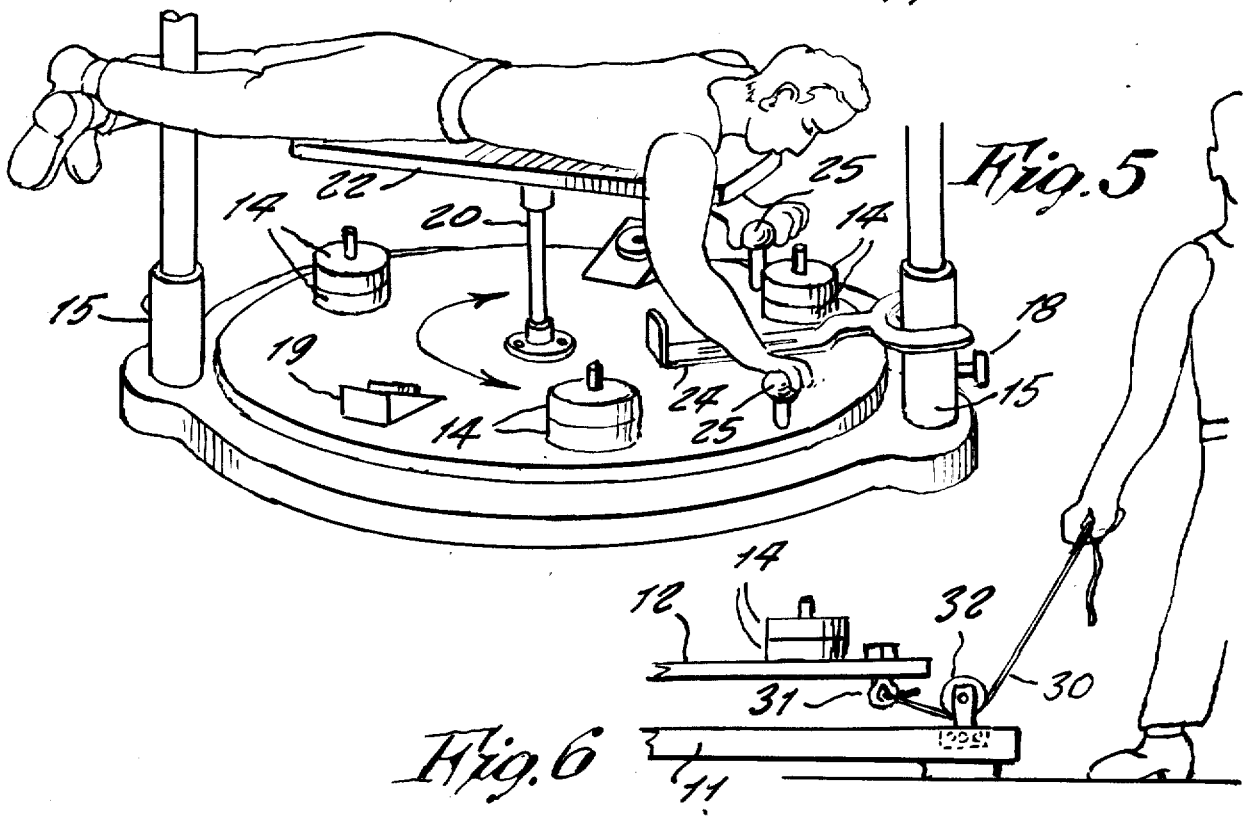
Fig. 5
Fig. 6

WEIGHTED ROTATABLE THERAPEUTIC EXERCISE DEVICE

Matter enclosed in heavy brackets [ ] appears in the original patent but forms no part of this reissue specification; matter printed in italics indicates the additions made by reissue.

BACKGROUND OF THE INVENTION

While various exercising devices have been developed heretofore for promoting physical fittness by doing torsion movements of different parts of the body, none of such devices are particularly designed for persons requiring therapeutic treatments.

SUMMARY OF THE INVENTION

Accordingly it is a principal object of the present invention to provide a therapeutic exercise device that is designed especially for such persons who are obliged to be either seated or in a prone position while exercising, and wherein such exercises will be therapeutically beneficial thereto.

Another object is to provide a therapeutic exercise device on which various torsion twisting exercises for different parts of the body may be done, so as to suit all kinds of therapeutic cases, and wherein the device is also suitable for exercise use by all other persons as well.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a side view of the invention shown ready for operative use.

FIG. 2 is a perspective view of the turn table shown alone, and also locked.

FIG. 3 is an enlarged perspective view of the locking clamp shown unlocked.

FIG. 4 is a front view of a modified form of the invention.

FIG. 5 is a fragmentary perspective view thereof shown in use by a person laying down upon a center panel, clasping a post by his legs and about to unlock to platform.

FIG. 6 is a fragmentary side view of the device showing a bicep exercise means incorporated thereon.

DETAILED DESCRIPTION OF THE PREFERRED EMBODIMENT

Referring now to the drawings in greater detail, the reference numeral 10 represents a therapeutic exercise device according to the present invention, wherein there is a stationary base 11 upon which a turntable 12 is supported rotatably free by means of a thrust bearing 13. Adjustable quantities of weights 14 are carried at balanced locations upon the turntable, so as to require greater strength to overcome momentum in starting, stopping or reversing the turntable rotation.

A pair of stanchions 15 upon the base serve to support either a pair of pipe handles 16, shown in FIG. 1, or a pipe frame 17, shown in FIG. 4, secured in the stanchions by set screws 18. A pair of inclined foot rests 19 are also provided on the turntable for a person to brace his feet thereagainst, while holding the pipe handles or frame and trying to rotate the turntable, as shown in FIGS. 1 and 4.

In the present invention, a post 20 is mountable upon a center of the turntable, and either a seat 21 or a horizontal board 22 forming a bed or table is supported rotatably free thereupon by means of a thrust bearing 23 on the post, so that a person may either sit or lay down thereupon, and twist his body while holding the pipe handles or the pipe frame. When such freely rotatable seat or bed is used, the turntable may be secured from rotation by means of a latch 24 slidably supported on the turntable so as to grasp around one of the stanchions, as shown in FIGS. 1, 2, 4 and 5.

As shown in FIG. 5, a pair of knobs 25 are also mounted on the turntable, for being grasped in the hands while a person lays on the board 22 and holds the pipe frame 17 between his legs, as shown in the same figure.

As shown in FIG. 4, a head clamp 26 may be removably installed on the pipe frame for adjustably being clamped around a person's head 27 and hold it rigidly while the person rotates himself with the seat by grasping the stationary handles 28 of the pipe frame. Pads 29 on the clamp cushion his head from the clamp metal parts.

Thus it is evident that different parts of the body may be exercised with a tortion-twisting action for therapeutic results.

As shown in FIG. 6, a tow rope 30 tied to an eye bolt 31 near a periphery of the turntable may be passed around a pulley 32 supported at a stationary location on the base. Thus, pulling on the rope so to cause the turntable to rotate, will develop the arm biceps of a person standing either upon the turntable or of the device 10, as shown.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

I claim:

1. A therapeutic exercise device, comprising, in combination, a stationary base, a rotative turntable on said base, stanchions spaced from the turntable and mounted on opposite sides of said base for interchangeably supporting a pipe frame or pipe handles upon said stanchions and means extending through said turntable adapted to be used to support a person while performing various twisting exercises a tow rope, tied at one end to an eye bolt mounted near the periphery of said turntable, said rope leaving passed around a pulley on said base, at a stationary location on said base while the opposite end of said rope is adaptable to be held in the hand of a person so as to be pulled by said person.

*2. A therapeutic exercise device, comprising, in combination, a stationary base, a horizontally disposed, rotatable turntable mounted on said base and having a single degree of freedom about a vertical axis, stationary stanchion*

*means spaced from the turntable at the side of the base and supporting handle means to be gripped by a person while performing various twisting exercises on the turntable, and support means mounted on and extending upwardly from the center of the turntable and being in substantial alignment of the vertical axis thereof and adapted to support the torso of the person while exercising on the turntable.*

*3. A therapeutic exercise device according to claim 2, said support means comprising a post situated centrally of and supported by the turntable, said post having a seat supported thereon, on which the person exercising sits while gripping said handle means and rotating the turntable.*

*4. A therapeutic exercise device according to claim 3, comprising adjustable weight means carried by said turntable for resisting starting and stopping of the rotation of the turntable.*

*5. A therapeutic exercise device according to claim 3, wherein said seat is rotatable about said vertical axis.*

* * * * *